United States Patent

[11] 3,543,638

| [72] | Inventor | Karl J. Braun<br>Springdale, Connecticut |
| --- | --- | --- |
| [21] | Appl. No. | 778,043 |
| [22] | Filed | Nov. 22, 1968 |
| [45] | Patented | Dec. 1, 1970 |
| [73] | Assignee | Braun Engineering Corporation<br>Stamford, Connecticut |

[54] TRAVEL EXTENSION ATTACHMENT FOR MACHINE TOOLS
7 Claims, 7 Drawing Figs.

[52] U.S. Cl. .................................................. 90/58
[51] Int. Cl. .................................................. B23d 7/08
[50] Field of Search .................................. 90/58, 21, 19; 51/240

[56] References Cited
UNITED STATES PATENTS

| 1,443,899 | 1/1923 | Kusold | 90/58 |
| --- | --- | --- | --- |
| 3,461,776 | 8/1969 | Hamori et al. | 90/58 |

*Primary Examiner*—Gil Weidenfeld
*Attorney*—Blair, St. Onge and Mayers

ABSTRACT: A feed travel extension attachment for machine tools comprising an attachment worktable floating on the main machine tool worktable. An attachment lead screw is secured to the main worktable and is drivingly connected to the machine tool lead screw to provide for conjunctive feed travel of both the main worktable and the attachment worktable. Increased movement of the attachment worktable relative to the main worktable is permitted to accommodate longer continuous workpiece travel than is otherwise possible.

Patented Dec. 1, 1970

INVENTOR
Karl J. Braun
BY
Blair Cesari + St Onge
ATTORNEYS

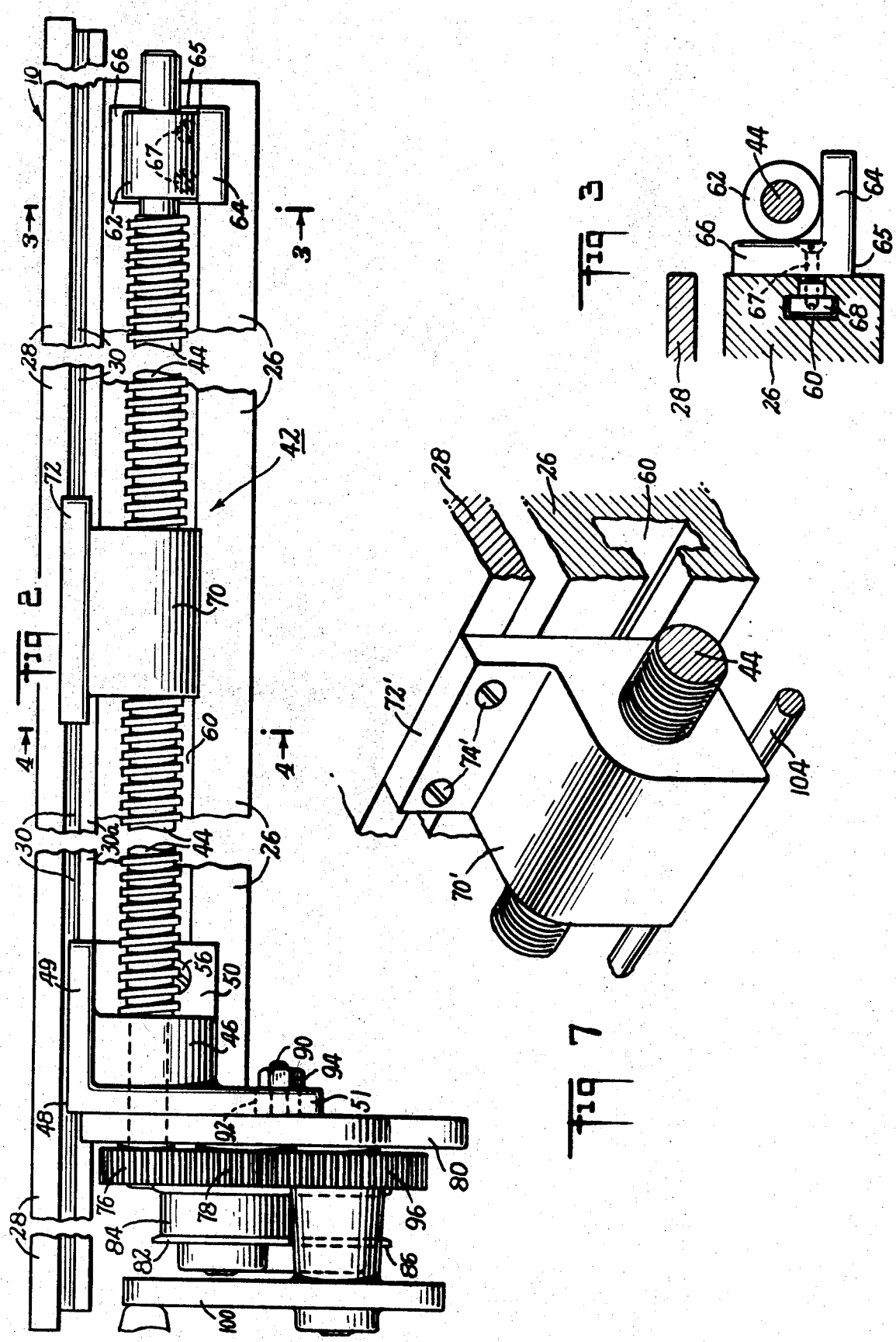

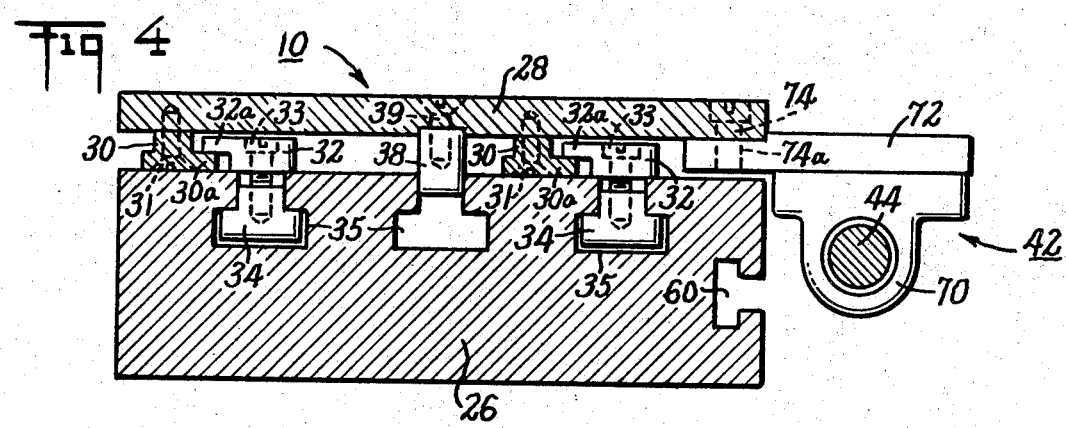
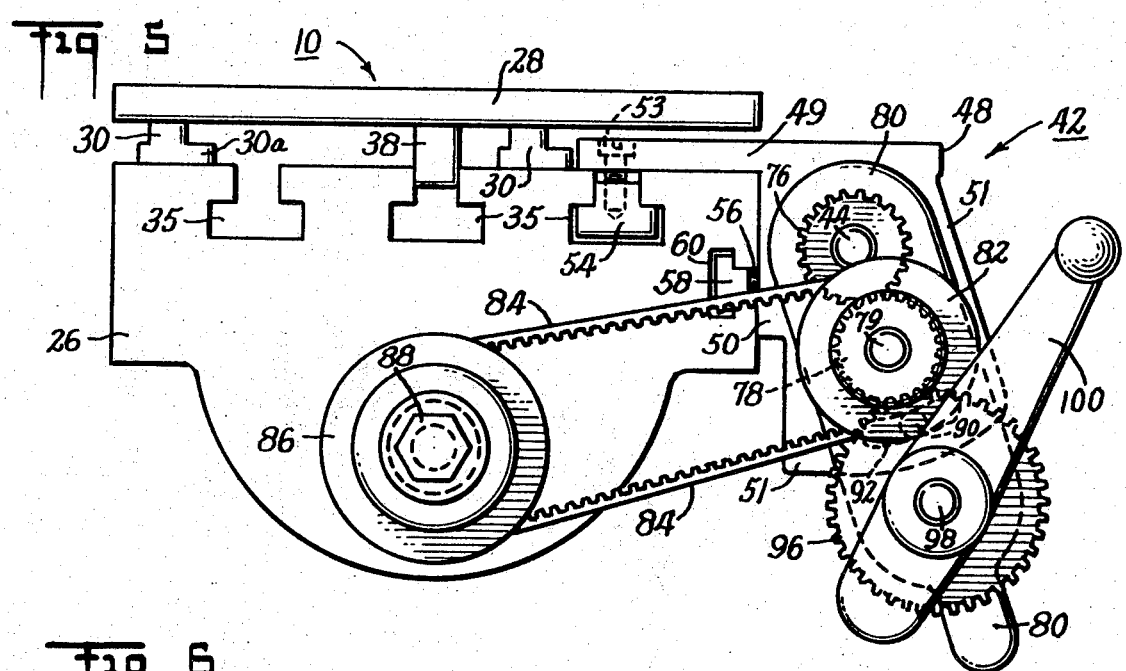
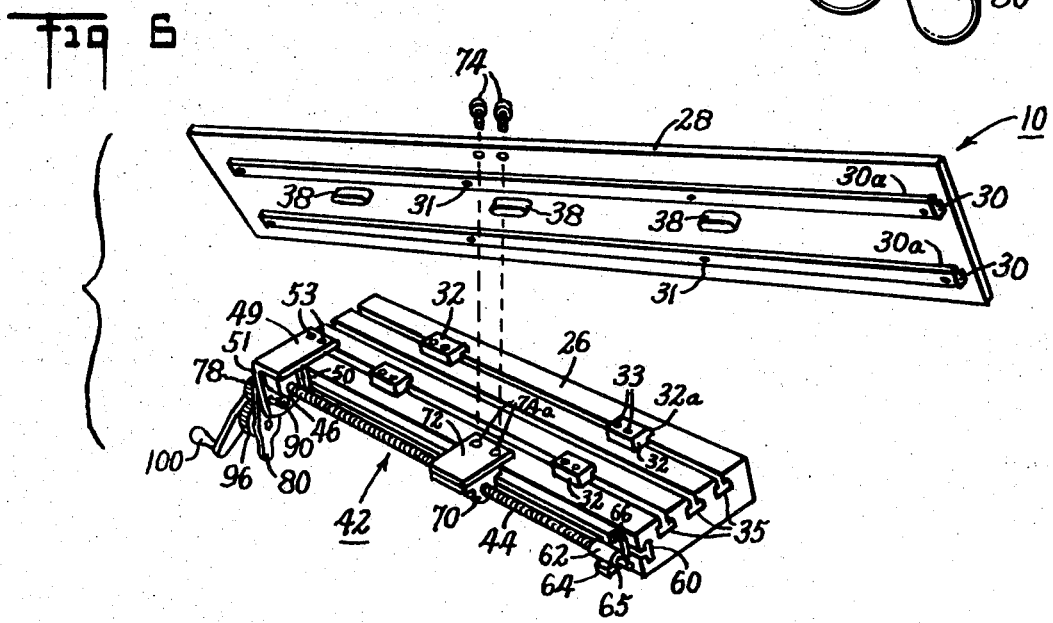

TRAVEL EXTENSION ATTACHMENT FOR MACHINE TOOLS

BACKGROUND OF THE INVENTION

Machine tools such as milling machines, jigborers, drill presses, etc., are rather limited to machining workpieces whose dimensions do not exceed the dimension of their workpiece supporting tables. If, for example, it is desired to make a continuous cut of a length exceeding the normal length of travel of the supporting worktable, it becomes necessary to clamp one end of the workpiece on the table and make an initial cut. Then, the workpiece is unclamped, advanced over the worktable surface, relocated, and again clamped in order to continue or complete the cut. If the desired cut is particularly long, this procedure must be executed several times, thus wasting considerable time. Then to, additional equipment may be necessary to support the overhanging portions of the workpiece. Such additional supporting equipment must support the overhanging portions of the workpiece at the same height as the worktable to prevent warping and bending thereof. Moreover to accommodate feeding movement of the workpiece past the cutting tool, this supporting equipment, particularly for heavy workpieces, has to provide a form of conveyor supporting surface, such as a series of rollers. Consequently, such additional supporting equipment is both elaborate and expensive.

An additional drawback to the procedure of moving the workpiece relative to the work supporting table pursuant to making an elongated cut as a series of shorter cuts is that it is extremely difficult to make a precise realinement of the workpiece on the worktable at the beginning of each short cut. Consequently, the transition from one short cut to the next is rarely smooth and exact, and may not be acceptable.

The only alternative to this procedure is to use a larger, more expensive machine tool whose worktable has sufficient length of travel capabilities to continuously feed the workpiece past the tool for the entire length of the cut to be made, as well as to provide continuous support for the workpiece.

It is appreciated that similar problems are encountered in other operations than milling where the dimensions of the workpiece exceed the normal length of travel capabilities of the machine tool work supporting table.

SUMMARY OF THE INVENTION

According to the invention, there is provided a feed extension or travel extender attachment for machine tools, such as milling machines, jigborers, drill and punch presses, etc. The invention has particular application to extending the capabilities of small, inexpensive machine tools, such that they can handle workpieces having dimensions which heretofore could only be conveniently handled on larger, more expensive machine tools.

In accordance with the invention, an attachment worktable is supported on the main machine tool worktable in a freefloating manner such as to accommodate relative movement therebetween. Suitable holddown means maintain the attachment table and the main worktable in contiguous relation while permitting relative sliding movement therebetween in a desired work feed direction.

Further in accordance with the invention, there is provided a lead screw which is mounted to the main machine tool worktable in such a manner as to require no alteration or modification thereof. That is, attachment of the lead screw to the main worktable takes advantage of only those attachment facilities which it already has.

The attachment lead screw is driven in conjunction with the normal machine tool lead screw to produce relative movement between the attachment and main worktables. The amount of feed travel extension achieved by the invention is a function of the degree of this relative movement, i.e., the extent by which the movement of the attachment worktable exceeds that of the main worktable in the work feed direction.

By virtue of the present invention, an attachment is provided for increasing the feed travel of an existing machine tool. The attachment may be mounted and demounted in a matter of minutes, and is both inexpensive and simple in design.

DESCRIPTION OF THE DRAWINGS

FIG. 2 is an enlarged front elevational view, partially broken away, of the table attachment of FIG. 1.

FIG. 3 is a vertical sectional view taken along line 3-3 of FIG. 2.

FIG. 4 is a vertical sectional view taken along line 4-4 of FIG. 2.

FIG. 5 is an end elevational view of the table attachment of FIG. 2.

FIG. 6 is an exploded perspective view of the table attachment of FIG. 1.

FIG. 7 is a fragmentary perspective view of a modification of a portion of the table attachment of FIG. 2.

DETAILED DESCRIPTION OF THE INVENTION

Figure 1:
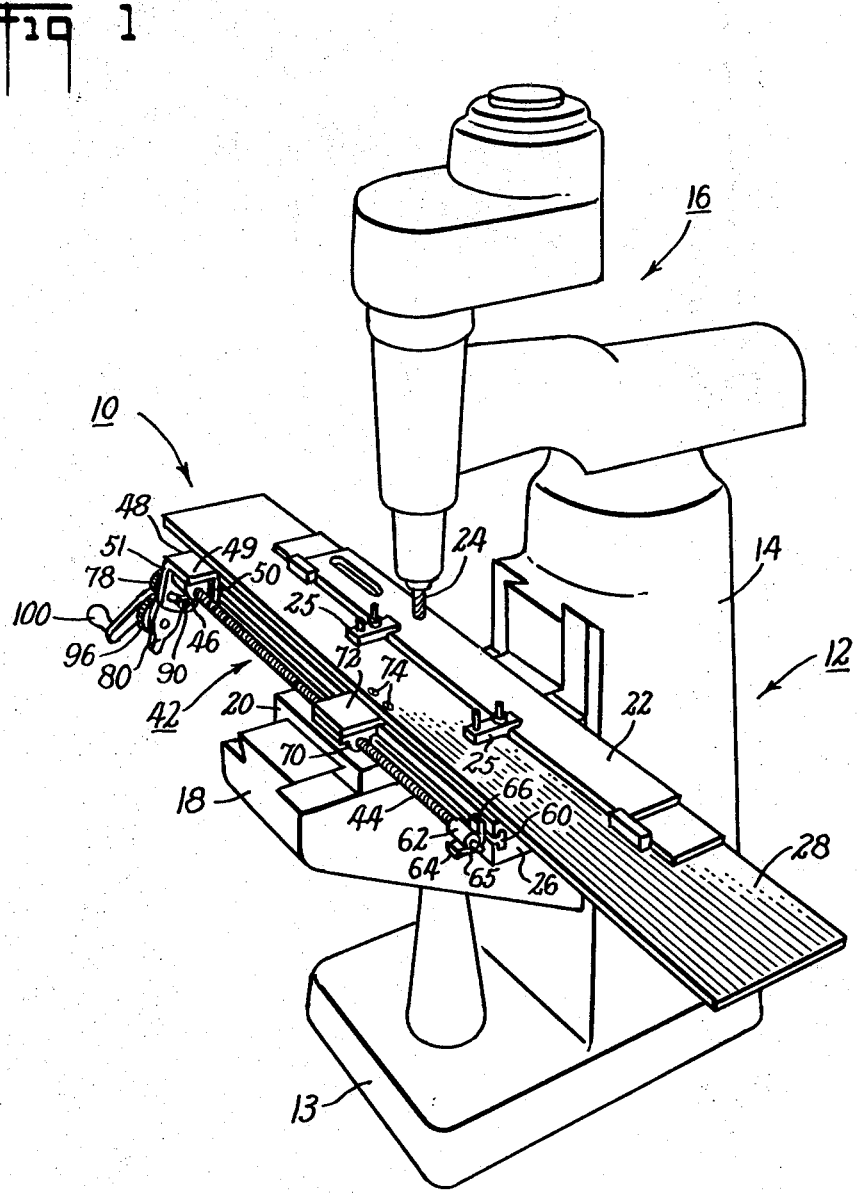
FIG. 1 is a perspective view of a milling machine adapted with the crossfeed extension table attachment of the present invention.

While the feed extension attachment, generally indicated at 10 in FIG. 1, is shown adapted to a vertical milling machine, generally indicated at 12, it will be appreciated that the invention may be adapted to extend the feed travel a variety of machine tools, such as jigborers, punch and drill presses, etc. The vertical milling machine 12 is of conventional design including a base 12 supporting a column 14 atop which is mounted a head 16. A vertically adjustable knee 18 supports a saddle 20 movable toward and away from the column 14 in positioning a workpiece 22 relative to a cutting tool 24. The saddle 20 supports a worktable 26, which is movable relative thereto in a crossfeed direction pursuant to translating the workpiece 20 relative to the cutting tool 24 during a milling operation.

The general construction of attachment 14 is perhaps best visualized in the exploded view of FIG. 6. The attachment includes an elongated attachment worktable 28 whose overall length is preferably at least twice that of worktable 26 in the crossfeed direction. While it is desirable to make the worktable 28 elongated in the work feed direction, i.e., longer than the main worktable 26, it will be appreciated that such elongation is not necessary in order to achieve the principal object of the invention, namely feed travel extension.

A pair of elongated ways 30, coextensive with the length of attachment table 28, are secured in spaced, parallel relation to the under side thereof by bolts 31, as best seen in FIG. 4. When the attachment table 28 is placed on the milling machine table 26, the bottom surfaces of ways 30 rest on the upper surface of the milling machine table. The ways 30 permit sliding relative movement between tables 26 and 28, while at the same time creating clearance spacing therebetween. Each way 30 is formed having a laterally extending lip 30a spaced from the under surface of the attachment table 28, as seen in FIGS. 4 and 6. A plurality of holddown lugs 32 are secured to the upper surface of the milling machine table 26 by bolts 33 engaging T-nuts 34 accommodated in elongated T-shape keyways 35 formed in the milling machine table surface (FIG. 4). Keyways 35 are a conventional feature of milling machine worktables. It is seen that the function of the holddown lugs 32 is to permit relative sliding movement between tables 26 and 28, while maintaining them in contiguous vertical relationship. The number of lugs 32 may be varied without departing from the invention.

In order to maintain the tables 26 and 28 alined in the crossfeed direction, a plurality of guide lugs 38 are secured to the under surface of table 28 by bolts 39, as seen in FIG. 4. The lower portions of each guide lug 38 extend into the vertical portion of the middle one of the three keyways 35.

For the purpose of translating the attachment table 28 relative to the milling machine table 26, a lead screw assembly 42, best seen in FIG. 2, is secured to the milling machine table. This lead screw assembly includes a lead screw 44 mounted at one end for rotation in a bearing housing 46 (FIGS. 2 and 6). The bearing housing 46 is supported by a bracket 48 having a horizontally extending flange 49 (FIGS. 5 and 6), a vertically extending flange 50 (FIG. 2), and a second vertically extending flange 51 lying in a plane normal to the plane of flange 50. The horizontal flange extends laterally through the clearance gap between tables 26 and 28 to a point overlying an end of the outermost keyway 35. A pair of bolts 53 extend through the end of horizontal flange 49 to enthreadingly engage T-nuts 54 accommodated in keyway 35 to anchor bracket 48 to the milling machine table 26. Furthermore, bolts 56 extend through bores in bracket flange 50 to engage T-nuts 58 accommodated in a keyway 60 formed in the front edge of milling machine table 26. Keyway 60 is also a conventional feature of most milling machine worktables.

The other end of the lead screw 44 is fitted with a bushing 62 which rests on the horizontal leg 64 of an L-shaped bracket 65 secured to the milling machine table 26. As seen, the vertical leg 66 of bracket 65 is provided with a pair of bores through which bolts 67 extend for threaded engagement with T-nuts 68 accommodated in keyway 60. The reason for this particular form of mounting will be explained later.

To translate the attachment table 28 relative to the milling machine table 26 through rotation of the lead screw 44, a nut 70 is threadingly engaged thereon. The nut 70 is provided having a laterally extending flange 74 extending into the clearance gap between tables 26 and 28. Tie bolts 74 pass through holes in the front edge of the table 28 at approximately midlength and are threaded into tapped holes 74a in nut flange 74 to secure nut 70 to the attachment table. It is thus seen that upon rotation of lead screw 44, nut 70 advances along the lead screw carrying with it table 28. It is to be noted that lead screw assembly 42 itself moves in conjunction with the milling machine table 26. Consequently, rotation of lead screw 44 results in motion of table 28 relative to the tool 24 which is either additive or subtractive, depending upon the direction of rotation and pitch of lead screw 44, from the crossfeed movement of the milling machine table. Of course, to accomplish the objects of the invention, the movement of worktable 28 is additive to that of table 26.

It will now be appreciated that by virtue of the lack of rigidity in the support of the right-hand end of lead screw 44 (FIG. 2) the possibility of binding of nut 70 on the lead screw is eliminated, something that might otherwise occur unless the lead screw end mountings are precisely alined and the lead screw 44 is of precision quality. Thus, the flexible end mounting afforded by bracket 65 lends to the simplicity, as well as the reliability of the invention. However if absolute precision is desired a precision lead screw 44 may be mounted by rigid, alined mounting brackets at each end.

Referring now to FIGS. 2 and 5, the end of lead screw 44 supported in bearing housing 46 extends therebeyond and carries a gear 76 keyed thereon. Gear 76 engages a second gear 78 rotating on a stub shaft 79 secured to an arm 80. This arm is, in turn, pivotally mounted about the lead screw end intermediate gear 76 and the vertically depending flange 51 of bracket 48. Secured to gear 78 and also rotating on stub shaft 79 is a pulley 82 which is driven by a timing belt 84 wrapped about a pulley 86 keyed to the hexagonal end 88 of the milling machine lead screw (not shown). Normally, a hand crank (not shown) is fitted on the hexagonal end 88 of the milling machine lead screw pursuant to facilitate manual crossfeed movement of the milling machine table 26. Pursuant to adapting the attachment 10 of the invention to the milling machine 12, this handcrank is removed and the pulley 86 is substituted therefor. Once the timing belt 84 is fitted around pulleys 82 and 86, arm 80 is swung in the counterclockwise direction (FIG. 5) to obtain the desired belt tension, and then is locked in place by a bolt 90 extending through a hole in the arm 80 and an elongated arcuate slot 92 in the depending flange 51 of bracket 45. A nut 94 is threaded on the end of bolt 90 to clamp the arm 80 against bracket flange 51, thereby locking the arm 80 in place.

In order to provide for manual crossfeed movement of tables 26 and 28, a gear 96 is mounted for rotation on a second stub shaft 98 secured to arm 80. A crank 100 is secured to gear 96 and is turned to rotate lead screw 44 through gears 78 and 76, and also to rotate the milling machine lead screw through gear 78, pulley 82, timing belt 84 and pulley 86.

From the foregoing description, it is seen that the attachment 10 of the invention is readily mounted to a conventional milling machine, such as vertical milling machine 12, without requiring any modification or alteration of the milling machine itself, at least insofar as the most common makes are concerned. To mount the attachment 10, holddown lugs 32 are secured to the milling machine table 26, and the attachment table 28 is merely slid onto table 26 such that the holddown lugs engage ways 30. The lead screw assembly 42 is mounted as a unit by merely securing the end brackets 46 and 65 using bolts to engage the various T-nuts into keyways 35 and 60. Bolts 74 secure extension table 28 to nut 70 of the lead screw assembly to complete the mounting. The normal crossfeed crank is removed and pulley 86 is substituted. Timing belt 84 is wrapped around pulleys 86 and 82 and, after achieving appropriate belt tension, the attachment is ready for use.

In many cases, after the attachment 10 has been used for a particular job and it is desired to remove it for the next job, it may be found that only the attachment table 28 need be removed. That is, the lead screw assembly 42 may remain mounted on the milling machine table 26 without interfering with milling operations on workpieces supported on the milling machine table 26. The only problem that may be encountered is that nut 74 may rotate on the lead screw 44 such that the elongated flange 74 would interfere with portions of the milling machine during crossfeed movement of the worktable 26. To prevent this, the construction of the nut 70 may be modified as seen in FIG. 7. As seen, the nut 70' is formed having a rather short vertically extending flange 72'. Attachment of nut 70' to attachment table 28 is effected by bolts 74' which extend through bores in flange 72' and thread into tapped holes formed in the front edge of table 28. In order to maintain nut 70' in the orientation shown in FIG. 7 during those times when the extension table is removed, a rod 104 mounted at its ends by the lead screw end brackets extends beneath nut 70' to prevent it from rotating about the lead screw 44 and interfering with milling operations when the attachment 10 is not in use.

Alternatively, the attachment table 28 may be left in place, and the drive connection between lead screw 44 and the main lead screw (belt 84) is eliminated. In this case, it is desirable to provide suitable means for locking the position of the attachment table 28 on the main table 26.

The extension table 28 may be fabricated from any suitable metal, such as steel, aluminum and magnesium. It my may be equipped with suitable clamping means 25 (FIG. 1) and locating stops (not shown) for positioning and clamping the workpiece 22 thereon pursuant to a milling operation. It will be appreciated the pitch of lead screw 44, and the diameters of gears 76, 78 and pulleys 82, 86 may be varied to obtain a wide variety of extension table crossfeed rates and travel distance relative to the cutting tool 24. Moreover, other forms of drive arrangements are contemplated for coupling the attachment lead screw 44 to the main lead screw. Rather than using the machine tool feed motor, separate, external feed drive may be coupled to lead screw 44. If the lead screw 44 is of the same hand as the main lead screw, then intermediary gear 78 is unnecessary; pulley 82 being keyed directly on the attachment lead screw shaft.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. For a machine tool having a work supporting table movable in a predetermined feed direction relative to a work tool, an attachment comprising, in combination:
   A. an attachment work supporting table supported on the machine tool table;
   B. holddown means secured to the machine tool table and engaging said attachment table for maintaining them in contiguous relation while permitting sliding relative movement therebetween in the feed direction; and
   C. a lead screw assembly including
      1. a lead screw,
      2. brackets mounting the ends of said lead screw for rotation, said brackets adapted to detachably engage a keyway formed in one edge of the machine tool table,
      3. a nut threadingly engaging said lead screw and detachably connected to said attachment table, and
      4. drive means coupled to said lead screw for rotating same to produce relative movement between said attachment table and the machine tool table in the feed direction to extend the length of travel of the work relative to the work tool.

2. For a machine tool having a work supporting table movable in a predetermined feed direction relative to a work tool, an attachment comprising, in combination:
   A. an attachment work supporting table supported on the machine tool table;
   B. holddown means secured to the machine tool table and engaging said attachment table for maintaining them in contiguous relation while permitting sliding relative movement therebetween in the feed direction; and
   C. a lead screw assembly including
      1. a lead screw,
      2. brackets mounting the ends of said lead screw for rotation, said brackets being detachably mounted to the machine tool table, one of said brackets including a flange for nonrigidly mounting one end of said lead screw,
      3. a nut threadingly engaging said lead screw and detachably connected to said attachment table, and
      4. drive means coupled to said lead screw for rotating same to produce relative movement between said attachment table and the machine tool table in the feed direction to extend the length of travel of the work relative to the work tool.

3. For a machine tool having a work supporting table movable by rotation of a machine tool lead screw in a predetermined feed direction relative to a work tool, an attachment comprising, in combination:
   A. an attachment work supporting table supported on the machine tool table;
   B. holddown means secured to the machine tool table and engaging said attachment table for maintaining them in contiguous relation while permitting sliding relative movement therebetween in the feed direction; and
   C. an attachment lead screw assembly including
      1. a lead screw,
      2. brackets mounting the ends of said lead screw for rotation, said brackets being detachably mounted to the machine tool table, and
      3. a nut threadingly engaging said lead screw and detachably connected to said attachment table; and
   D. drive means coupling said attachment lead screw to the machine tool lead screw such that rotation of one of the lead screws imparts rotation to the other, whereby to produce continuous relative movement between the work tables in the feed direction and extended travel of a workpiece supported on said attachment worktable relative to the work tool.

4. The attachment defined in claim 3 wherein said drive means includes:
   1. a first pulley drivingly connected to the machine tool lead screw;
   2. a second pulley drivingly connected to said attachment lead screw; and
   3. a drive belt engaging said first and second pulleys.

5. The attachment defined in claim 4 wherein said drive means further includes:
   1. a first gear keyed to one end of said attachment lead screw;
   2. a second gear secured to and rotating with said second pulley, said second gear engaging said first gear;
   3. a third gear engaging said second gear; and
   4. a hand crank drivingly connected to said third gear.

6. The attachment defined in claim 5, and:
   A. an arm mounted for pivotal movement about said one end of said attachment lead screw;
      1. said arm mounting said second and third gears, said second pulley and said handcrank, and
      2. said arm being selectively angularly positionable to adjust the tension of said drive belt.

7. For a machine tool having a work supporting table equipped with keyways in its upper surface and front edge and movable in a predetermined feed direction relative to a work tool, an attachment comprising, in combination:
   A. an attachment work supporting table supported on the machine tool table;
   B. holddown means secured to said attachment table and detachably engaging the keyways in the upper surface of the machine tool table for maintaining the tables in contiguous relation while permitting sliding relative movement therebetween in the feed direction; and
   C. guide lugs secured to the underside of said attachment table and slidingly received in a keyway in the upper surface of the machine tool table for maintaining said attachment table alined with the machine tool table during relative movement therebetween;
   D. a lead screw assembly including
      1. a lead screw,
      2. brackets mounting the ends of said lead screw for rotation, said brackets adapted to, detachably engage the keyway formed in the front edge of the machine tool table,
      3. a nut threadingly engaging said lead screw and detachably connected to said attachment table, and
      4. drive means coupled to said lead screw for rotating same to produce relative movement between said attachment table and the machine tool table in the feed direction to extend the length of travel of the work relative to the work tool.